July 16, 1940. D. C. BRETT 2,208,493
COMBINED HANDLE, REEL HOLDER, AND DRAG FOR FISHING POLES
Filed Sept. 7, 1939 2 Sheets-Sheet 2
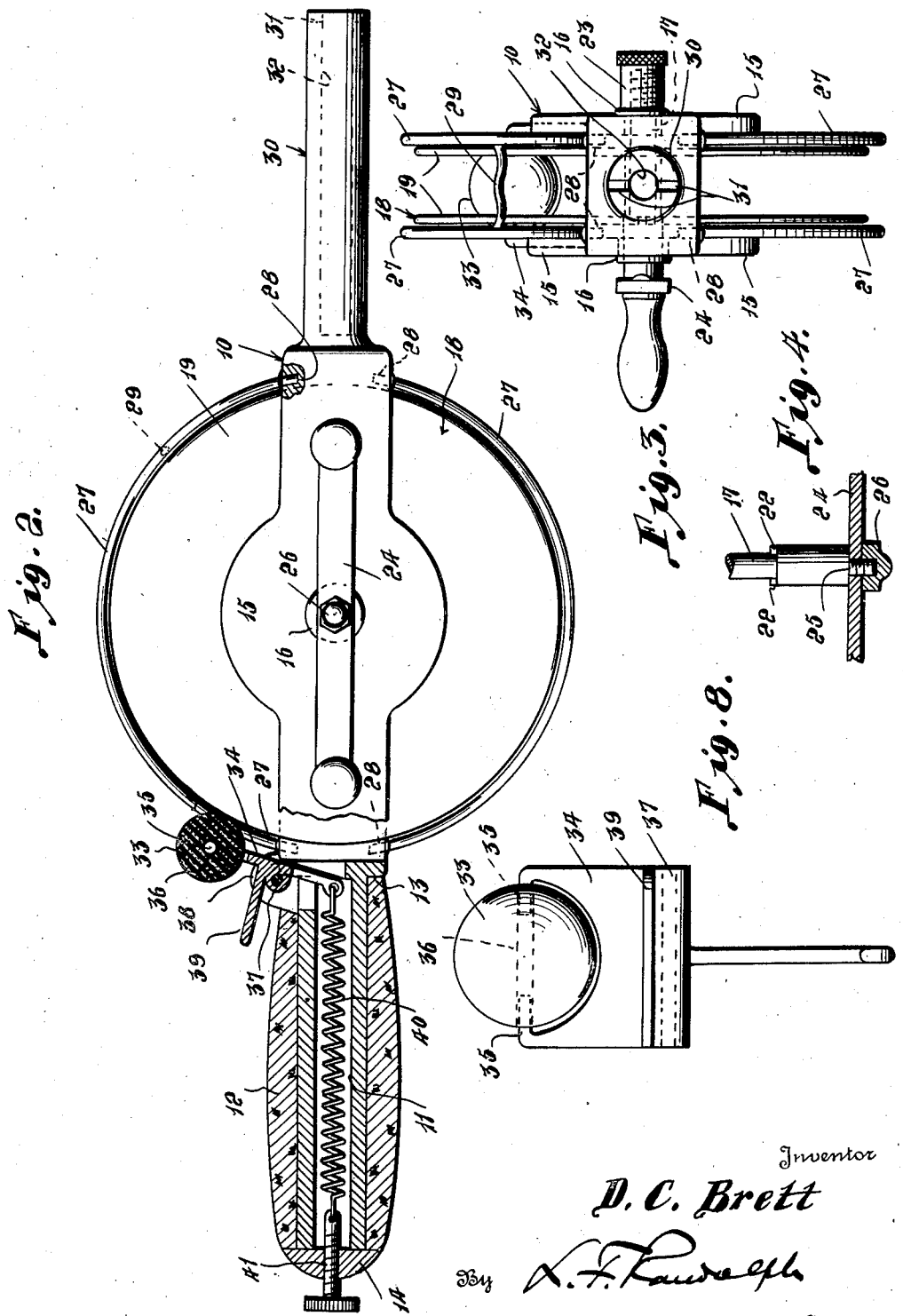
Inventor
D. C. Brett
By
Attorney Patented July 16, 1940

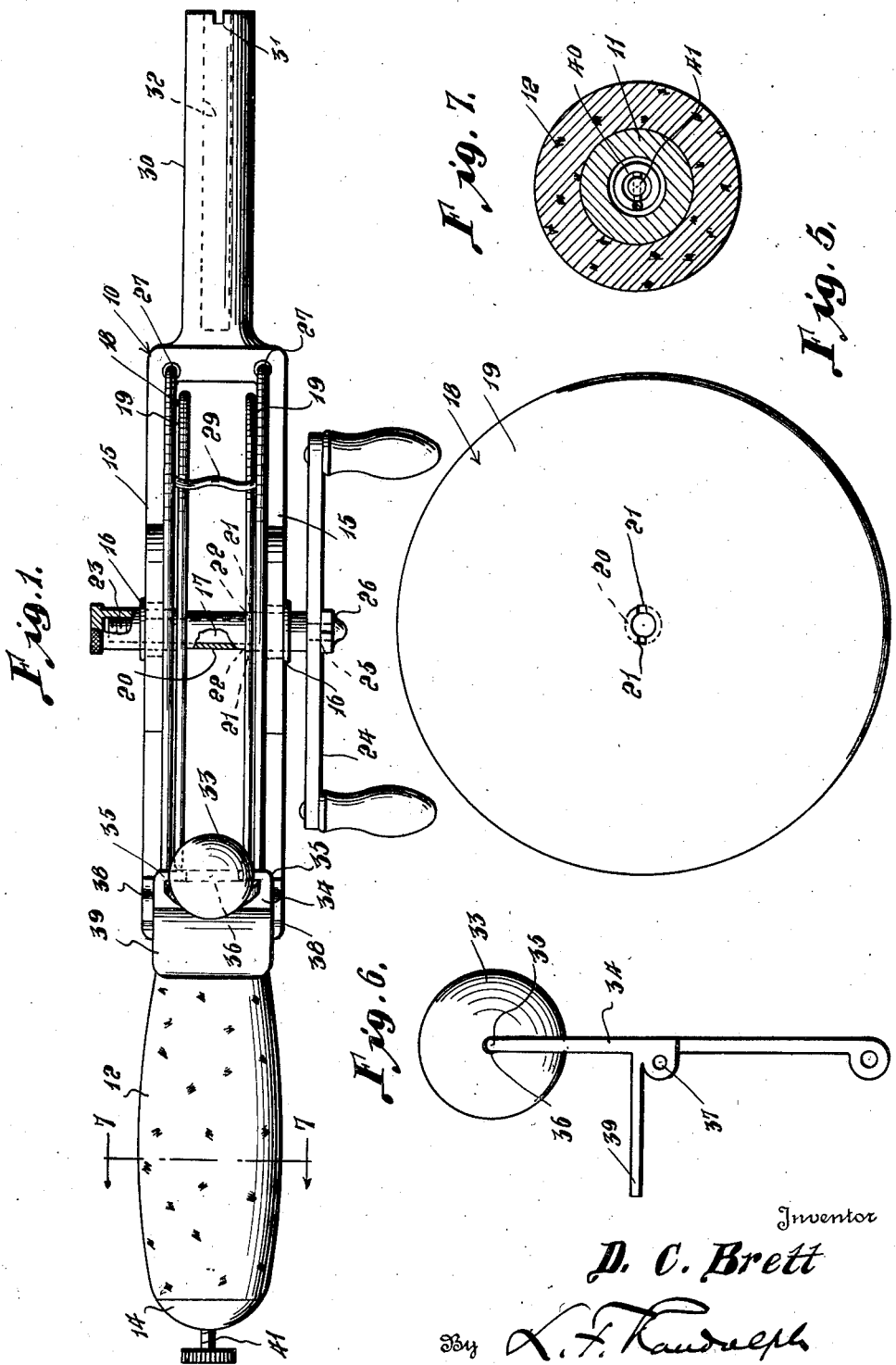

2,208,493

UNITED STATES PATENT OFFICE 2,208,493

COMBINED HANDLE, REEL HOLDER, AND DRAG FOR FISHING POLES

Donald C. Brett, Parma, Idaho

Application September 7, 1939, Serial No. 293,801

7 Claims. (Cl. 43—22)

This invention relates to a device which functions as a handle, reel holder and drag in connection with a fishing pole.

The invention especially aims to provide a structure which will co-act with either a steel or cane rod of any desired length for bait casting or fly casting, rendering it necessary to carry but one handle, reel holder and drag. One may accommodate as many bait casting and fly casting rods as desired.

It is further aimed to provide a novel structure in which the reel is detachably mounted exactly in the center of the handle to effect perfect balance for the hand in casting.

It is further aimed to provide a novel combined drag and brake, preferably using a rubber ball, and wherein the pressure is applied thereon by the thumb to cause the ball to engage or bear on the edges of the reel instead of adjacent the hub, in order to be more positive in action and more advantageous generally.

The more specific objects and advantages will become apparent from a consideration of the description following taken in connection with accompanying drawings illustrating an operative embodiment.

In said drawings:

Figure 1 is a plan view illustrating the invention;

Figure 2 is a view partly in longitudinal section and partly in side elevation, of the device of Figure 1;

Figure 3 is an end elevation looking from the right of Figure 2;

Figure 4 is a detail view partly in section, showing the connection whereby the reel shaft connects to the reel;

Figure 5 is a side elevation of the reel;

Figure 6 is an enlarged side elevation of the combined brake and drag detached;

Figure 7 is a cross sectional view taken on the line 7—7 of Figure 1, and

Figure 8 is a side elevation of the combined brake and drag taken at a right angle to Figure 6.

Referring specifically to the drawings wherein like reference characters designate like or similar parts, the device consists of a metallic or other section generally designated 10 and which may be of any suitable length. In practice, I find a length of twelve inches preferable. Such section 10, at one end, has a hollow handle portion 11 surrounded by a cork or equivalent hand grip 12 held in place against a shoulder 13 on the section 10 by a cap 14 fastened to the hollow portion 11. Intermediate the ends of section 10, it is open or slotted as shown, having side walls 15 affording a dual bearing 16 for a removable reel shaft generally designated 17. A relatively narrow reel 18, having the usual spaced walls or disks 19 connected by a hollow hub 20, is disposed between the walls 15 and has extensions or notches 21 at its bore, which receive bits or lugs 22 on the shaft 17, to cause the reel to turn with the shaft 17. A nut 23 is screw threaded onto one end of the reel shaft while an operating handle or crank 24 is removably passed over a stud 25 on the opposite end of the shaft 17 and held in place by a nut 26 screw threaded to that stud as shown.

Segmental guard wires, 27, collectively forming rings about the reel, have their terminals entered in slots or sockets 28 on the interior of the walls 15 and soldered rigidly therein. An evener for the line, is provided at 29, spanning and being connected to opposite wires or segments 27.

At the end opposite the handle, the section 10 has a shank 30, hollow as shown and open at the outer end, and provided in that end with diametrically alined notches 31. Shank 30 is adapted for attachment of either a metallic pole or a cane or bamboo pole thereto, the former having means to extend into the bore or socket 32 of the shank and the latter having a bore or socket adapted to receive the shank 30, and in each event, the rod having a pin or the like which engages the notches 31 to prevent relative turning between the same and the shank 30.

A combined brake and drag structure is employed which utilizes an elastic rubber or other ball 33 urged into contact with the marginal edges of the walls or disks 19 of the reel. Such ball 33 is carried by a lever 34 having inturned pivot members 35 disposed in opposite ends of a bore 36 extending diametrically through the ball 33. Said lever 34 is pivoted at 37 to lugs 38 integral with the handle portion 11. Said lever above pivot 37 has a thumb rest 39, preferably integral with it, and below its pivot, a contractile coil spring 40 is connected. Said spring 40 is located in the bore of the portion 11 and has its other end attached to a screw member 41, screw threaded in an opening in the cap 14. Screw member 41 is adjustable, to vary the tension of the spring 40, and thereby regulate the pressure by which the ball 33 grips the marginal edges of the plates 19 of the reel.

By reason of the invention, various steel, bamboo or cane rods may be used with the same handle and reel combination, the invention thus accommodating as many bait casting and fly casting rods as one wishes to use. The reel is in the center of the handle, making a perfect balance for the hand in casting. Various reels or spools may be used as preferred, it being a simple matter to detach the reel or spool by removing the shaft 17.

The desired braking and dragging effect is imparted by the ball 33 or by the fingers direct, at the marginal edges of the reel or spool as preferred. The tension of the drag of the member 33 on the spool is regulated, by the screw 41.

While making a cast, the thumb is adapted to rest on the member 39 and just as the cast is made, the thumb slips off of that rest and the tension and drag is again applied by the spring 40 to such edges of the reel or until the cast is completed. Particular attention is called to the fact that the drag and brake is superior because the pressure is brought to bear on the edge of the reel instead of on or near the hub and is thereby more positive in action, slowing down the reel to a stop just as the force of weight is spent, unwinding the reel and thereby stopping back lash. The brake is applied by pressing the thumb on or against the rubber ball 33.

Various changes may be resorted to provided they fall within the spirit and scope of the invention.

I claim as my invention:

1. A handle structure of the class described adapted for attachment to a rod, means on the structure to removably mount a reel, comprising spaced plates equidistant from the longitudinal median line of the handle between which the reel is located, a reel shaft mounted removably in said plates, a hollow handle extending from the structure, a drag and brake device movably mounted on the handle to co-act with a reel on said shaft, and spring means within the handle connected to said device urging said device to operative position.

2. A handle structure of the class described adapted for attachment at one end to a rod, said structure having a slot therethrough, a reel in said slot, a shaft removably mounted by the handle and removably connected to said reel, wire segments connected to the handle around said reel, and a line evener connecting adjacent segments.

3. A handle structure of the class described adapted for attachment at one end to a rod, said structure having a slot therethrough, a reel in said slot, a shaft removably mounted by the handle and removably connected to said reel, drag brake means on the handle engageable with the periphery of the reel, said means having a part extending exteriorly of the handle, a cap at one end of the handle, and a contractile spring within the handle connected to said part and cap.

4. A handle structure of the class described adapted for attachment at one end to a rod, said structure having a slot therethrough, a reel in said slot, a shaft removably mounted by the handle and removably connected to said reel, drag brake means on the handle comprising a lever pivoted on the handle, an elastic element on the lever engageable with the periphery of the reel, said lever extending interiorly of the handle, and spring means within the handle connected to the lever operatively positioning said elastic element.

5. A handle structure of the class described adapted for attachment at one end to a rod, said structure having a slot therethrough, a reel in said slot, a shaft removably mounted by the handle and removably connected to said reel, drag and brake means on the handle engageable with the periphery of the reel, a lever pivoted on the handle mounting said drag and brake means, and spring means within the handle urging said drag and brake means into engagement with the reel.

6. A handle structure of the class described adapted for attachment at one end to a rod, said structure having a slot therethrough, a reel in said slot, a shaft removably mounted by the handle and removably connected to said reel, drag and brake element on the handle engageable with the periphery of the reel, a lever pivoted on the handle mounting said drag and brake element, spring means within the handle urging said drag and brake element into engagement with the reel, said drag and brake element being an elastic ball, and a thumb rest on the lever between the ball and its pivot.

7. A handle structure of the class described adapted for attachment at one end to a rod, said structure having a slot therethrough, a reel in said slot, a shaft removably mounted by the handle and removably connected to said reel, wire segments connected to the handle adjacent opposite ends of said slot and disposed in guard relation to the reel, and drag brake means mounted on the handle operable between the wire segments for co-action with the reel.

DONALD C. BRETT.